United States Patent
Hsu

(10) Patent No.: US 7,964,227 B2
(45) Date of Patent: Jun. 21, 2011

(54) COOKING METHOD

(76) Inventor: Chia-Yi Hsu, Taipei (TW)

( * ) Notice: Subject to any disclaimer, the term of this patent is extended or adjusted under 35 U.S.C. 154(b) by 740 days.

(21) Appl. No.: 12/083,438

(22) PCT Filed: Sep. 14, 2006

(86) PCT No.: PCT/CN2006/002400
§ 371 (c)(1),
(2), (4) Date: Apr. 11, 2008

(87) PCT Pub. No.: WO2007/041930
PCT Pub. Date: Apr. 19, 2007

(65) Prior Publication Data
US 2009/0229474 A1 Sep. 17, 2009

(30) Foreign Application Priority Data
Oct. 14, 2005 (CN) .......................... 2005 1 0113498

(51) Int. Cl.
*A01K 43/00* (2006.01)
(52) U.S. Cl. .................. 426/233; 426/521; 426/523
(58) Field of Classification Search .................. 426/231, 426/233, 520, 521, 523; 99/324, 325, 331, 99/332; 219/446.1, 448.11
See application file for complete search history.

(56) References Cited

U.S. PATENT DOCUMENTS

| | | | | |
|---|---|---|---|---|
| 4,093,841 A | * | 6/1978 | Dills | 219/712 |
| 4,791,363 A | * | 12/1988 | Logan | 324/754.07 |
| 6,740,855 B1 | * | 5/2004 | DeCobert et al. | 219/506 |
| 2005/0029249 A1 | * | 2/2005 | Wanat | 219/494 |

FOREIGN PATENT DOCUMENTS

| | | | |
|---|---|---|---|
| CN | 2063385 | * | 10/1990 |
| CN | 1251503 | * | 4/2000 |
| CN | 1314124 | * | 9/2001 |
| CN | 1608561 | * | 4/2005 |
| WO | WO 03105639 | * | 12/2003 |

OTHER PUBLICATIONS

Temperature Control for Food in Pots on Cooking Hobs, Uwe Has and Dimitar Wassilew, IEEE Transactions on Industrial Electronics, vol. 46, No. 5, Oct. 1999.*
Translation of all the CN documents listed in the Foreign Patent documents section above.*

* cited by examiner

*Primary Examiner* — Drew E Becker
*Assistant Examiner* — Preston Smith
(74) *Attorney, Agent, or Firm* — Guice Patents PLLC

(57) ABSTRACT

A cooking method comprises heating step, which involves heating foodstuffs into pan to first predetermined temperature with the purpose of food safety, lowering heating powder so as to enter slow pan mode, and then increasing temperature slowly and constantly to a second temperature of foodstuffs aging. The method further comprises the step of allowing the main heater to stop heating after reaching the second temperature, then entering cooling step so as to lower pan temperature naturally to above third predetermined preservation temperature while maintaining little heat source at bottom of pan during the cooling step, so as to maintain convection in pan and allow foodstuffs temperature uniform.

5 Claims, 2 Drawing Sheets

COOKING METHOD

BACKGROUND OF THE INVENTION

1. Field of the Invention

The present invention relates to a cooking method, and more particularly, to a heating method that effectively cooks foodstuffs subject to foodstuffs' properties, assuring foodstuffs safety and saving energy.

2. Description of the Related Art

Following the progress of human civilization, fine culture of food and drink is developed.

To fit different time schedules and to satisfy different cooking requirements, "slow cooker" and "stew-pot" cooking methods are developed.

Slow cooker is a cooking method to cook food using a small power when one is going to sleep at night or to work outdoors at daytime so that one can enjoy the food when wakes up in the morning or returns home after working. Traditionally, the heating power used in a slow cooker is subject to the designed cooking time, for example, 4 hours, 6 hours or 8 hours. Normally, the heating power for slow cooker is about 250 W, or one half of a regular electric rice cooker. However, this traditional design does not meet certain cooking requirements, and a person employing this method may be unable to have food be well cooked or may cause food to be excessively cooked. When cooking food at a low heating temperature, for example, within 20~50° C., for a long period, microbes may grow on the cooking food. To understand the accurate design principle of slow cooker, the cooking object and properties of food must be studied at first.

The heating process during cooking is primarily to kill bacteria and microbes that are harmful to human body, and secondarily to convert food into an eatable condition for absorption by human beings.

Normally, microbes stop movement when at 60° C. (140° F.). However, harmful microbes on food will be killed only when the temperature reaches 74° C. The temperature range within 15° C.~52° C. is the most dangerous range where microbes grow fast. Foods will start to deteriorate when keeping under this dangerous temperature range for long. Heating cannot eliminate toxic substances produced by microbes.

Therefore, when employing a slow cooker cooking method, the initial heating power must be able to heat the cooker (cooking pan) to the safety temperature level to stop microbes stop from movement within a predetermined time period. Normally, the cooker shall reach 60° C. (140° F.) within 2 hours after start of the slow cooker cooking method. Except the reason of food safety, heating can convert foods into an eatable form for easy absorption by human beings. For example, cooking by heating can soften meat and decompose starch from a crystal structure into absorptive gel. Further, tough meat is not easy to be thoroughly cooked. Actually, tough meat contains a big amount of collagen that starts to decompose into gel-like condition and to dissolve in water when heated to 60° C.~65° C. This process requires time; however it is not necessary to heat to the boiling status. Therefore, slow cooker cooking method is very suitable for cooking certain meat, more particularly, beef shank, to a softened status.

Cooking foods of starch group, such as rice, corn and etc., requires a relatively higher heating temperature, about 65° C.~93° C. so that contained starch can be thoroughly cooked into a gel-like condition.

SUMMARY OF THE INVENTION

The present invention has been accomplished under the circumstances in view. A cooking method in accordance with the present invention is designed subject to the following rules:

1. At the initial stage, the heating temperature must reach the safety temperature level within 2 hours so as to stop microbes from movement. In consideration of environmental factors and engineering tolerance, the temperature can be set within 65° C.~75° C.

2. Adjust the highest temperature subject to the type of foods to be cooked, for example, 85° C. for cooking meat to assure complete killing of microbes and well cooking of meat, or 95° C. for cooking cereal foods.

3. Cooker is designed to have excellent heat isolating and keeping effects, lowering heat dissipation speed and saving energy consumption. Conventional cookers for slow cooker cooking commonly use 250 W heater. When operating continuously over 4 hours, a conventional cooker consumes about 1 KW-hr, and the major part of the thermal energy is dissipated from the cooker. However, this heat dissipation function is necessary; otherwise the cooker cannot have the foods reach the safety temperature level within a reasonable time without causing the foods to be excessively cooked. Applying a slow cooker cooking method consumes much energy, about twice of a regular cooking method. To save energy consumption, conventional slow cooker cooking methods and cookers for slow cooker cooking must be modified.

When reached the set temperature during cooking, the heat power should be lowered to a level slightly lower that the heat dissipation speed of the cooker to have the internal temperature of the cooker be lowered slowly to a predetermined temperature-maintaining level, for example, 65° C., avoiding excessive cooking of foods. During this temperature lowering procedure, a low heat is provided at the bottom side of the cooker so that a convection in the cooker can be maintained, assuring uniformity temperature in the cooker.

DETAILED DESCRIPTION OF THE PREFERRED EMBODIMENT

Figure 1:
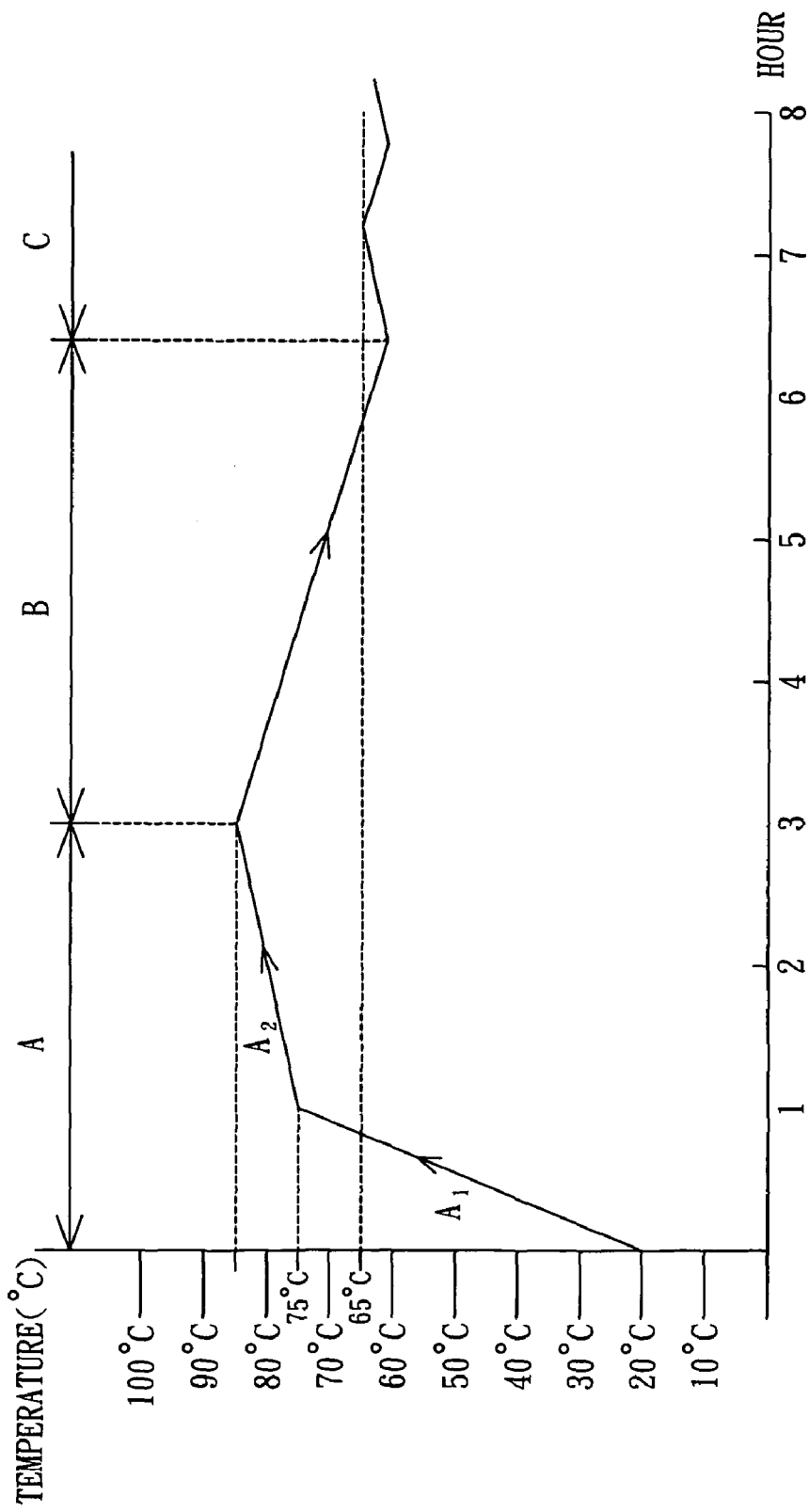
FIG. 1 is a cooking temperature-cooking time chart obtained subject to a cooking method according to the present invention.

Referring to FIG. 1, a cooking method in accordance with the present invention includes a heating step A, a temperature-lowering step B, and a temperature-maintaining step C. The cooking apparatus to be used is designed subject to the aforesaid three steps.

Figure 2:
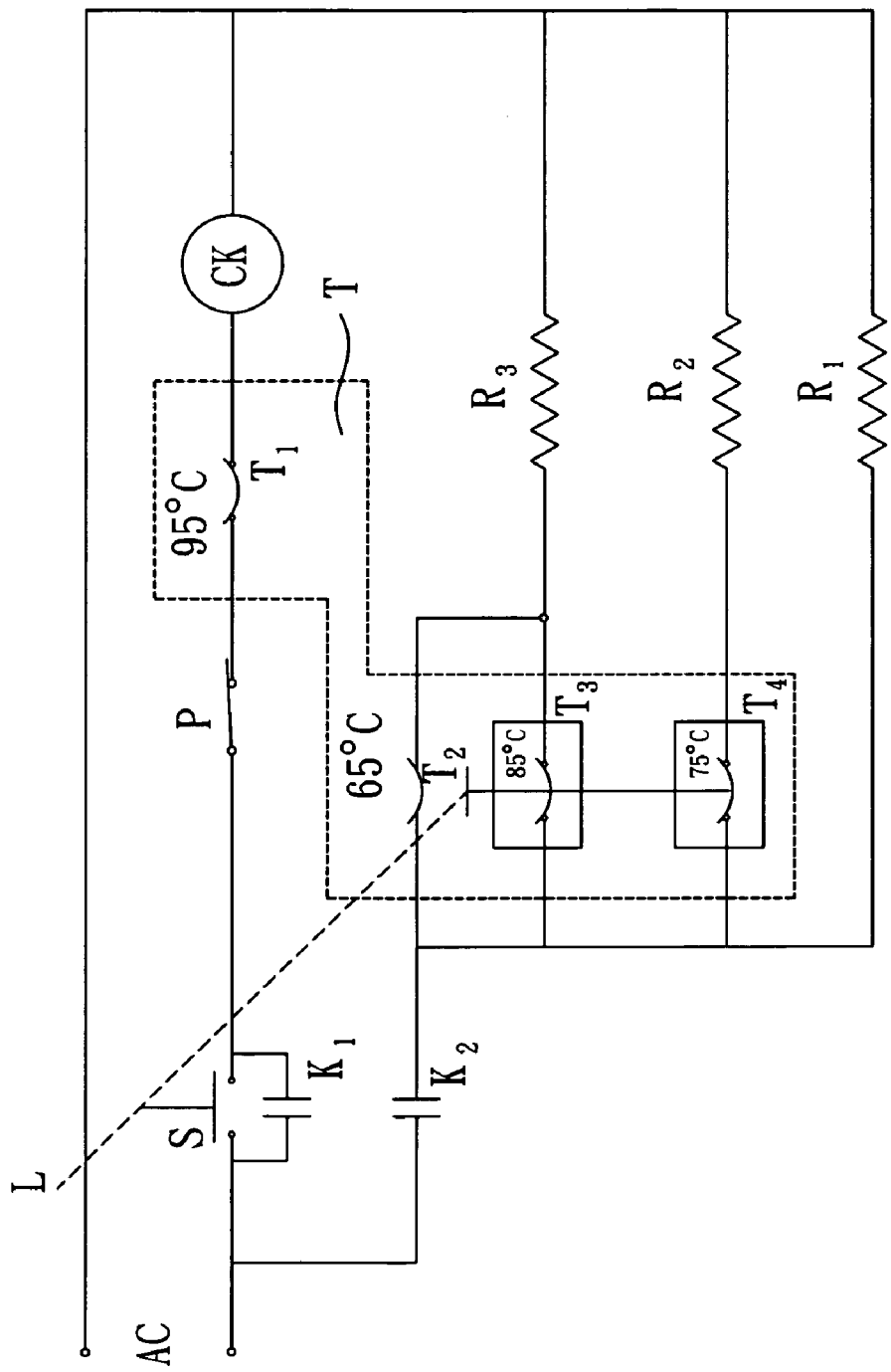
FIG. 2 is a schematic circuit diagram of a heating control circuit according to the present invention.

The cooking procedure of the cooking method shown in FIG. 1 can be controlled by means of electronic control or mechanical control. This electric heating control is obvious to any person skilled in the art. For easy understanding of the present invention, mechanical control, as shown in FIG. 2, is employed as an example. However, this embodiment is simply an example of the present invention but not a limitation.

In FIG. 2, the reference sign S indicates an activation switch. When the cooker (cooking pan) is set in the cooking position, the positioning switch, referenced by P, is switched off. When the activation switch S is pressed at this time, the coil assembly CK of the relay, referenced by K, is activated, causing double pole single-throw switches K1, K2 to be switched off. When operating the activation switch S, a linking device L is forced to return manual return bimetal temperature control devices T3 and T4, thereby resuming to off status. Switching off the switch K2 causes heating resistors R1, R2, R3 to be simultaneously conducted, corresponding to activation heating mode A1 in the heating step A shown in FIG. 1. When the temperature reaches 65° C., auto return bimetal temperature control devices T2 trips off, however the parallelly connected manual return bimetal temperature control device T3 remains OFF. When the temperature reaches 75° C., no microbes appear in foodstuffs, and at this time, the manual return bimetal temperature control device T4 trips off, the heating resistor R2 is switched off, and therefore the heating procedure enters a slow cooker mode (slow pan mode) A2. Because heating resistors R1 and R3 are low power heating resistors, the heating speed is slow. Therefore, the system enters the slow cooker mode at this moment. After a certain period during the slow cooker mode, the temperature rises to 85° C., and the slow cooker mode is done. At this time, the bimetal temperature control device T3 trips off, the heating resistor R3 is switched off, and therefore the system enters the temperature-lowering step B. At this time, the heating resistor R1 is maintained in operation. Because the heating resistor R1 is a lower-power heat source that provides a thermal energy smaller than the heat dissipating power of the cooker (cooking pan), the temperature of the cooker (cooking pan) is lowered slowly so that a convection is maintained in the cooker (cooking pan), keeping the temperature uniform in the cooker (cooking pan). Actually, the slow cooker mode is still running during this stage, however the consumption of power energy is low. When the temperature is lowered to 65° C., the bimetal temperature control device T2 is returned to its former position, and the system enters the temperature-maintaining step C. At this time, the heating resistor R3 is switched on again, maintaining the temperature around 65° C. During the temperature-lowering step B, it passes through the point of 85° C. and the point of 75° C., however, the temperature control devices T3 and T4 do not return to the off status automatically because they are manual return bimetal temperature control devices. Therefore, the temperature control devices T3 and T4 do no work during the temperature-maintaining step C.

When the cooking is done, the cooker (cooking pan) is removed from the stove, and at this time, the positioning switch P is switched off, the coil assembly CK of the relay, switches K1, K2 are electrically disconnected, stopping the supply of power supply.

The auto return bimetal temperature control devices T1 is a safety device. When the temperature reaches 95° C., the auto return bimetal temperature control devices T1 trips off, turning off power supply.

Subject to the aforesaid embodiment of the present invention, the cooking method of the present invention assures well cooking of foodstuffs and high safety of cooked foodstuffs and saves consumption of energy.

What is claimed is:

1. A cooking method employed to a cooker to cook foodstuffs, comprising the steps of:
    a primary heating step to heat said cooker to a first temperature within a predetermined safety time period, for killing microbes in the foodstuffs;
    a secondary heating step to perform a slow cooker mode in heating said cooker to a second temperature by means of a reduced heat power when said cooker reaches said first temperature, for causing the foodstuffs aging;
    a temperature-lowering step to stop from heating said cooker when the temperature of said cooker reaches said second temperature, and then to provide a heat source at a bottom side of said cooker for maintaining a convection in said cooker and enabling the temperature of said cooker to be lowered; and
    a temperature-maintaining step to have the temperature of said cooker to be lowered to a third temperature and to keep said foodstuffs safety in said cooker in said third temperature.

2. The cooking method as claimed in claim 1, wherein said first temperature is within 65° C.~75° C.

3. The cooking method as claimed in claim 1, wherein said second temperature is within 85° C.~95° C.

4. The cooking method as claimed in claim 1, wherein said third temperature is within 60° C.~65° C.

5. The cooking method as claimed in claim 1, wherein said safety time period is not longer than 2 hours.

* * * * *